(12) United States Patent
Kikuma et al.

(10) Patent No.: US 9,835,937 B2
(45) Date of Patent: Dec. 5, 2017

(54) PROJECTION-TYPE IMAGE DISPLAY DEVICE

(71) Applicant: JVC KENWOOD Corporation, Yokohama-shi, Kanagawa (JP)

(72) Inventors: Shinji Kikuma, Yokohama (JP); Takatsugu Aizaki, Yokohama (JP); Yasuki Arihara, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 15/383,084

(22) Filed: Dec. 19, 2016

(65) Prior Publication Data

US 2017/0205696 A1    Jul. 20, 2017

(30) Foreign Application Priority Data

Jan. 14, 2016    (JP) .................................. 2016-005050

(51) Int. Cl.
  *G03B 21/20* (2006.01)
  *G02B 5/28* (2006.01)
  (Continued)

(52) U.S. Cl.
  CPC ........... *G03B 21/204* (2013.01); *G02B 5/285* (2013.01); *G03B 21/2013* (2013.01);
  (Continued)

(58) Field of Classification Search
  CPC .............. G03B 21/204; G03B 21/2013; G03B 21/2033; G03B 21/2053; G03B 21/2066;
  (Continued)

(56) References Cited

U.S. PATENT DOCUMENTS

2011/0043761 A1    2/2011  Miyamae
2014/0168614 A1    6/2014  Matsubara et al.
      (Continued)

FOREIGN PATENT DOCUMENTS

JP    2012088473 A    5/2012
WO    2014174560 A1    10/2014
WO    2015190032 A1    12/2015

OTHER PUBLICATIONS

Extended European Search Report dated Jul. 7, 2017 corresponding to application No. 17151235.3-1903.

*Primary Examiner* — Sultan Chowdhury
(74) *Attorney, Agent, or Firm* — Nath, Goldberg & Meyer; Jerald L. Meyer

(57) ABSTRACT

A projection-type image display device includes a light source, a phosphor, and a filter. The light source emits a first blue illumination light. The phosphor generates a first yellow illumination light of a first wavelength band, which includes a component of a red band and a component of a green band, from a part of the first blue illumination light, and reflects a second blue illumination light and the first yellow illumination light. The filter reflects, to the phosphor side, a third blue illumination light that is a part of the second blue illumination light reflected by the phosphor, and attenuates a component of a second wavelength band of the first yellow illumination light, which is narrower than the first wavelength band. The phosphor also generates a second yellow illumination light from the third blue illumination light reflected by the filter.

4 Claims, 12 Drawing Sheets

(51) Int. Cl.
*H04N 9/31* (2006.01)
*G02B 5/30* (2006.01)

(52) U.S. Cl.
CPC ......... *H04N 9/3105* (2013.01); *H04N 9/3158* (2013.01); *H04N 9/3182* (2013.01); *G02B 5/3058* (2013.01)

(58) Field of Classification Search
CPC .. H04N 9/3114; H04N 9/3117; H04N 9/3161; H04N 9/3164; H01L 33/50; H01L 33/60; H01L 33/502; H01L 33/505
See application file for complete search history.

(56) References Cited

U.S. PATENT DOCUMENTS

2014/0347634 A1* 11/2014 Bommerbach ...... H04N 9/3158
  353/31
2015/0316775 A1* 11/2015 Hsieh ................. G03B 21/2013
  353/31

* cited by examiner

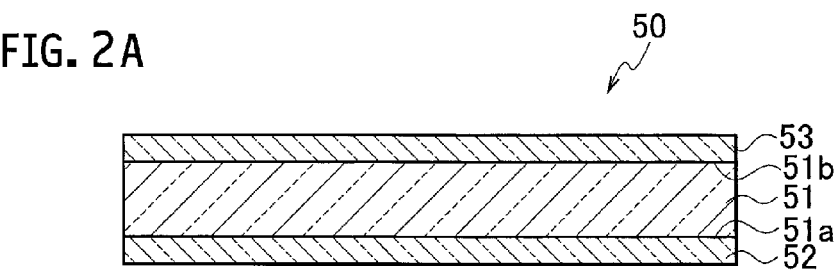
FIG. 2A
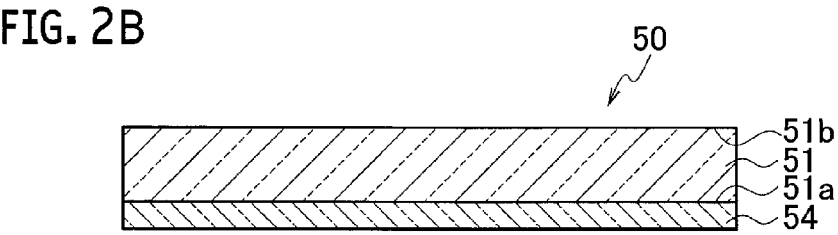
FIG. 2B
FIG. 3
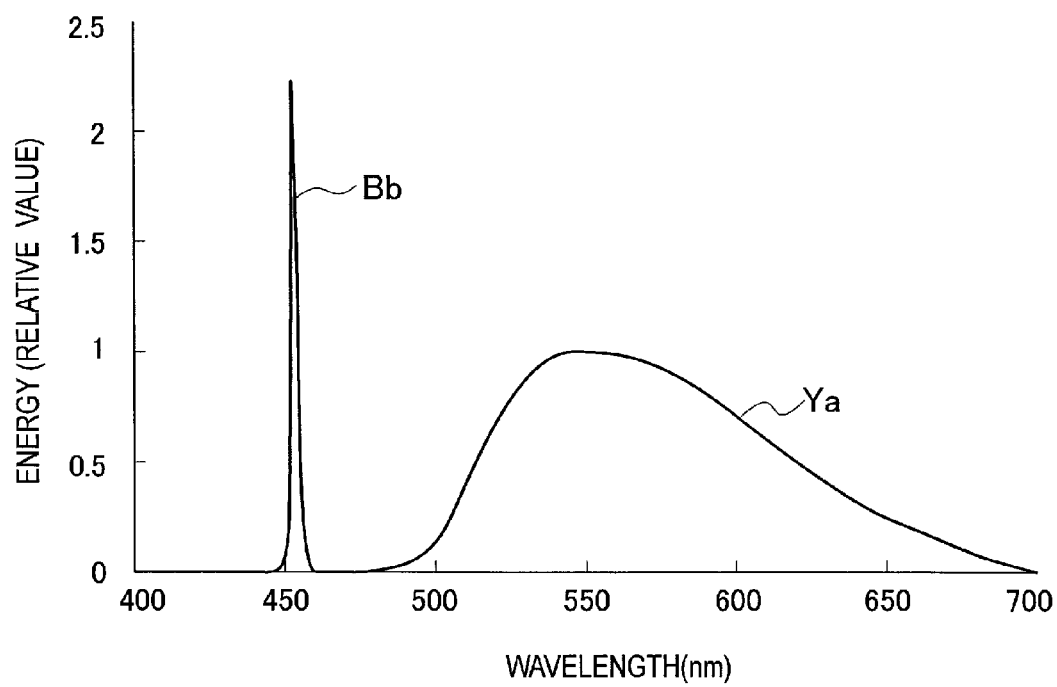

FIG. 14

| | | COLOR TEMPERATURE | BRIGHTNESS (RELATIVE COMPARISON) | COLOR GAMUT |
|---|---|---|---|---|
| FIRST EMBODIMENT | STATE WHERE FILTER 50 IS DISPOSED ON OPTICAL PATH (COLOR GAMUT PRIORITY MODE) | 6500K | 90% | LARGE |
| | STATE WHERE FILTER 50 IS RETRACTED FROM OPTICAL PATH (BRIGHTNESS PRIORITY MODE) | 6500K | 100% | SMALL |
| COMPARATIVE EXAMPLE | ONLY FUNCTION AS NOTCH FILTER IS PROVIDED (COLOR GAMUT PRIORITY MODE OF COMPARATIVE EXAMPLE) | 7500K | 80% | LARGE |

PROJECTION-TYPE IMAGE DISPLAY DEVICE

CROSS REFERENCE TO RELATED APPLICATION

This application is based upon and claims the benefit of priority under 35U.S.C.§119 from Japanese Patent Application No. 2016-005050 filed on Jan. 14, 2016, the entire contents of which are incorporated herein by reference.

BACKGROUND

The present disclosure relates to a projection-type image display device.

In a projection-type image display device, for example, a blue laser light source and a yellow phosphor are used as illumination light sources. A blue light image is generated by using the blue laser light source as the illumination light source. A red light image and a green light image are generated by using the yellow phosphor as the illumination light source. Specifically, the yellow phosphor is irradiated with a laser beam from the blue laser light source, and thereby converts energy of the irradiated laser beam into yellow light with a wavelength band including a red band and a green band.

The yellow light converted by the yellow phosphor includes many components of unnecessary wavelength bands between the red band and the green band. Therefore, a color gamut is biased to a yellow side, and becomes small as a whole.

Japanese Unexamined Patent Application Publication No. 2012-88473 (Patent Document 1) describes a projection-type image display device that removes the components of the unnecessary wavelength bands between the red band and the green band.

SUMMARY

In such a projection-type image display device as described in Patent document 1, though the color gamut is expanded by the filter, the brightness of the image decreases, and the white balance deviates.

It is an object of the embodiments to provide a projection-type image display device capable of suppressing the decrease of the brightness of the image by the filter and such a deviation in the white balance thereby.

An aspect of the embodiments provides a projection-type image display device including: a light source configured to emit a first blue illumination light; a phosphor configured to generate a first yellow illumination light of a first wavelength band from a part of the first blue illumination light, the first yellow illumination light including a component of a red band and a component of a green band, and configured to reflect a second blue illumination light and the first yellow illumination light; and a filter configured to reflect, to the phosphor side, a third blue illumination light that is a part of the second blue illumination light reflected by the phosphor, and configured to attenuate a component of a second wavelength band of the first yellow illumination light, the second wavelength band being narrower than the first wavelength band, wherein the phosphor also generates a second yellow illumination light from the third blue illumination light reflected by the filter.

BRIEF DESCRIPTION OF THE DRAWINGS

FIG. 2A is a cross-sectional view schematically showing the first example of a filter of a projection-type image display device according to the first embodiment.

FIG. 2B is a cross-sectional view schematically showing a second example of a filter of a projection-type image display device according to the first embodiment.

FIG. 3 is a spectral distribution diagram of yellow illumination light and blue illumination light, which is irradiated onto the filter.

FIG. 14 is a comparison diagram showing comparison results of color temperatures, relative brightness values, and color gamuts of display images.

DETAILED DESCRIPTION

By using FIG. 1 to FIG. 18, a description is made of projection-type image display devices according to the first and the second embodiments. The projection-type image display devices according to the first embodiment and the second embodiment are different from each other in the configuration of the filter, and are the same in other configurations.

First Embodiment

Figure 1:
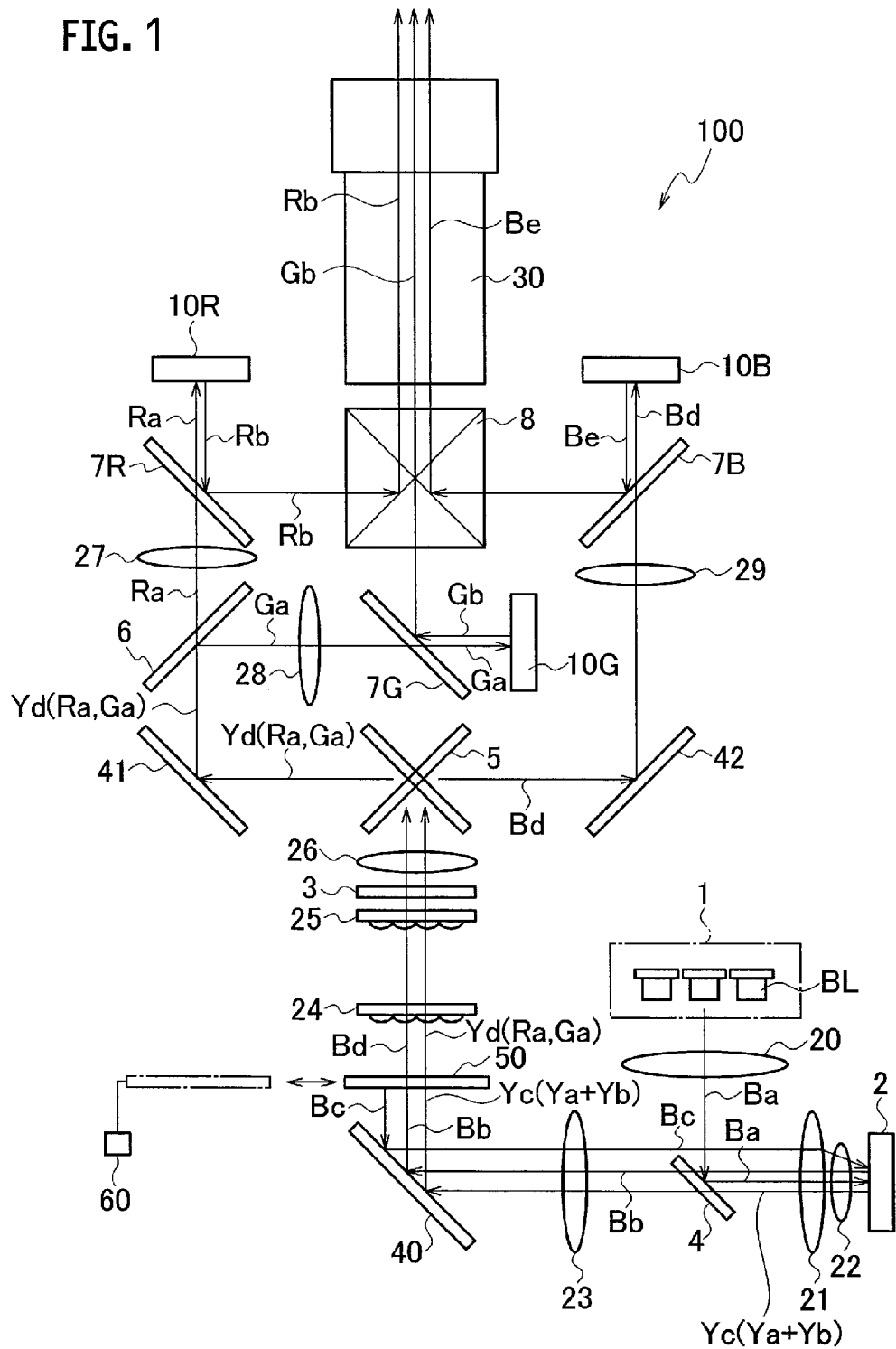
FIG. 1 is a configuration diagram showing a projection-type image display device according to the first embodiment.

In FIG. 1, a description is made of the projection-type image display device according to the first embodiment.

FIG. 1 shows an entire configuration of the projection-type image display device according to the first embodiment.

A projection-type image display device 100 includes: a light source 1; a phosphor 2; a polarization conversion system (PCS) 3; dichroic mirrors 4 to 6; reflection-type polarization plates 7R, 7G, and 7B; a color-combining prism 8; image display elements 10R, 10G, and 10B; lenses 20 to 30; reflecting mirrors 40 to 42; a filter 50; and a motor 60.

The light source 1 is composed of a laser array in which a plurality of blue laser elements BL is arrayed, for example. The light source 1 emits a blue laser beam. Hereinafter, the blue laser beam is referred to as blue illumination light. The condensing lenses 20, 21, and 22 condense the blue illumination light which is irradiated thereon. The dichroic mirror 4 has a function to reflect the blue illumination light, and to transmit yellow illumination light therethrough.

The phosphor 2 includes a fluorescent layer, which generates yellow illumination light of the first wavelength band including a component of the red band and a component of the green band, both of the components having an intensity corresponding to the intensity of energy of the light irradiated from the light source 1, specifically, an intensity of energy of a part of the blue illumination light irradiated from the light source 1. Moreover, the phosphor 2 includes a reflective surface that reflects the yellow illumination light and the blue illumination light which have transmitted through the fluorescent layer.

The light source 1 (the blue laser element BL) and the phosphor 2 compose the illumination light source. The collimator lens 23 turns the irradiated light into parallel light.

The filter 50 in the first embodiment is disposed in a way as to be freely-insertable and retractable from the optical path between the reflecting mirror 40 and the fly-eye lens 24. The filter 50 reflects a part of the blue illumination light to the phosphor 2 side, and attenuates a component of the second wavelength band of the yellow illumination light, which is narrower than the first wavelength band.

That is, the filter 50 has a function as a predetermined wavelength band reflection filter, which reflects a part of the blue illumination light and transmits the others therethrough; and a function as a notch filter, which attenuates a component of an unnecessary wavelength band between the band of the red illumination light and the band of the green illumination light and transmits components of other wavelength bands therethrough.

Note that, desirably, the filter 50 is disposed at an arbitrary position on the optical path of the parallel light between the collimator lens 23 and the fly-eye lens 24. In the first embodiment, the component of the second wavelength band is attenuated by being absorbed.

A description is made of the filter 50 by using FIG. 2A and FIG. 2B. FIG. 2A and FIG. 2B are cross-sectional views schematically showing the filter 50.

As shown in FIG. 2A, the filter 50 includes: a transparent substrate 51 such as a glass substrate; a dielectric multilayered film 52 (the first dielectric multilayered film) formed on the first surface 51a (for example, the irradiated surface) side of the transparent substrate 51; and a dielectric multilayered film 53 (the second dielectric multilayered film) formed on the second surface 51b (for example, the emitting surface) side of the transparent substrate 51.

The dielectric multilayered film 52 reflects a part of the blue illumination light, and transmits the others therethrough. That is, the dielectric multilayered film 52 has a function as the predetermined wavelength band reflection filter. The dielectric multilayered film 52 is a multilayered film in which high-refractive-index dielectric films and low-refractive-index dielectric films are laminated alternately with each other. By materials of the dielectric films, the thickness of each of the films, the number of layers and the like in the dielectric multilayered film 52, it is possible to set a desired reflectance value of the blue illumination light.

The dielectric multilayered film 53 attenuates the component of the second wavelength band of the yellow illumination light, which is narrower than the first wavelength band. That is, the dielectric multilayered film 53 has a function as the notch filter that attenuates the component of the wavelength band between the red band and the green band, and transmits the components of the other wavelength bands therethrough. The dielectric multilayered film 53 is a multilayered film in which high-refractive-index dielectric films and low-refractive-index dielectric films are laminated alternately with each other. By materials of the dielectric films, the thickness of each of the films, the number of layers and the like in the dielectric multilayered film 53, it is possible to set the wavelength band to a desired range for attenuating the component. Here, the component of the wavelength band between the band of the red illumination light and the band of the green illumination light is completely removed, whereby the color purity of the illumination light of each color can be enhanced.

In the filter 50, the dielectric multilayered film 52 may be formed on the irradiated side on the optical path, and the dielectric multilayered film 53 may be formed on the emitting side thereon, or alternatively, the dielectric multilayered film 52 may be formed on the emitting side, and the dielectric multilayered film 53 may be formed on the irradiated side.

Moreover, as shown in FIG. 2B, on the first surface 51a side of the transparent substrate 51, a dielectric multilayered film 54 may be formed which reflects a part of the blue illumination light to the phosphor 2 side, and attenuates the component of the second wavelength band of the yellow illumination light which is narrower than the first wavelength band. Specifically, the dielectric multilayered film 54 may be formed, the dielectric multilayered film 54 having the function as the predetermined wavelength band reflection filter which reflects a part of the blue illumination light and transmits the others therethrough, and the function as the notch filter, which attenuates the component of the wavelength band between the red band and the green band, and transmits the components of the other wavelength bands therethrough.

With materials of the dielectric films, the thickness of each of the films, the number of layers and the like in the dielectric multilayered film 54, it is possible to set the desired reflectance value of the blue illumination light, and to set the wavelength band to the desired range for attenuating the component between the red band and the green band. Here, on the second surface 51b, an anti-reflection film may be formed that decreases the reflectance of the second surface 51b. Note that the dielectric multilayered film 54 may be formed on the second surface 51b side of the transparent substrate 51, and moreover, the anti-reflection film for decreasing the reflectance of the dielectric multilayered film 54 may be formed on the light irradiated side of the dielectric multilayered film 54.

The motor 60 has a function as a driver that inserts the filter 50 onto the optical path and retracts the filter 50 from the optical path. The motor 60 is an example of a driver.

The fly-eye lenses 24 and 25 equalize the illumination distributions of the red illumination light, the green illumination light, and the blue illumination light, which are irradiated onto the image display elements 10R, 10G, and 10B. The PCS 3 aligns such pieces of the illumination light, which are irradiated thereonto to the p-polarization. The cross dichroic mirror 5 separates the yellow illumination light (including the red illumination light and the green illumination light) and the blue illumination light, which are irradiated thereonto, from each other.

The dichroic mirror 6 separates the light, which is irradiated thereonto by reflection and transmittance while taking a separation wavelength as a separation boundary. In the first embodiment, specifically, with respect to the yellow illumination light thus irradiated, the green illumination light is reflected, the red illumination light is transmitted, and the green illumination light and the red illumination light are separated from each other. Here, with regard to the reflectance of the green illumination light and the transmittance of the red illumination light, while taking the separation wavelength as a boundary, the reflectance becomes 100% on the short wavelength side, and the transmittance becomes 100% on the long wavelength side.

In the wavelength around the separation wavelength, the reflectance of the green illumination light and the transmittance of the red illumination light become small, and accordingly, it can be said that the width having the separation wavelength as the center is present on the separation boundary. By this width of the separation boundary, a component of the green wavelength band is included in the red illumination light, and a component of the red wavelength band is included in the green illumination light. From the viewpoint of utilization efficiency of light energy, it is ideal that no width of the separation boundary is present.

The reflection-type polarization plates 7R, 7G, and 7B have the function to reflect the s-polarization and transmit the p-polarization therethrough. For example, the reflection-type polarization plates 7R, 7G, and 7B can be composed of wire grids.

The image display element 10R is a red image-purpose optical modulator for optically modulating the irradiated red illumination light to generate red image light based on the image data of a red component. The image display element 10G is a green image-purpose optical modulator for optically modulating the irradiated green illumination light to generate green image light based on the image data of a green component. The image display element 10B is a blue image-purpose optical modulator for optically modulating the irradiated blue illumination light to generate blue image light based on the image data of a blue component.

The combining prism 8 has a function to reflect the blue image light and the red image light, to transmit the green image light therethrough, and to combine the red image light, the green image light, and the blue image light with one another.

The projection lens 30 projects the red image light, the green image light, and the blue image light onto a screen or the like, and displays a full-color image.

By using FIG. 1 to FIG. 8, a description is made of a state in which the filter 50 is disposed on the optical path, and a state where the filter 50 is retracted from the optical path.

The state in which the filter 50 is disposed on the optical path is referred to as the color gamut priority mode. The color gamut priority mode is a mode of prioritizing color reproducibility of the display image. A state where the filter 50 is retracted from the optical path is referred to as the brightness priority mode. The brightness priority mode is a mode of prioritizing the brightness of the display image.

[Color Gamut Priority Mode]

A description is made of the color gamut priority mode by using FIG. 1 to FIG. 6. The color gamut priority mode according to the first embodiment is the state where the filter 50 is disposed on the optical path.

As shown in FIG. 1, the blue illumination light Ba (the first blue illumination light) emitted from the light source 1 is condensed by the condensing lens 20, and is reflected by the dichroic mirror 4. The blue illumination light Ba is further condensed by the condensing lenses 21 and 22, and is irradiated onto the phosphor 2.

The phosphor 2 converts energy of the irradiated blue illumination light Ba and generates the yellow illumination light Ya (the first yellow illumination light) of the first wavelength band, including the red band and the green band.

The yellow illumination light Ya generated by the phosphor 2 transmits through the condensing lenses 22 and 21 and the dichroic mirror 4, and is irradiated onto the collimator lens 23. Note that a part of the blue illumination light Ba irradiated onto the phosphor 2 is reflected by the phosphor 2 without being converted into the yellow illumination light Ya, and is irradiated as the blue illumination light Bb (the second blue illumination light) onto the collimator lens 23.

The yellow illumination light Ya and the blue illumination light Bb, which are irradiated onto the collimator lens 23, become parallel light and are reflected toward the filter 50 by the reflecting mirror 40.

FIG. 3 is a spectral distribution diagram of the yellow illumination light Ya and the blue illumination light Bb, which are irradiated onto the filter 50. An axis of ordinates in FIG. 3 represents energy (relative value when a peak value of the yellow illumination light Ya is defined as 1). An axis of abscissas in FIG. 3 represents a wavelength (nm). In the first embodiment, while the peak value of the yellow illumination light Ya is 1, the peak value of the blue illumination light Bb is approximately 2.2.

Since the blue illumination light Bb is a laser beam, the wavelength band is narrow. Meanwhile, the yellow illumination light Ya is generated in such a manner that the blue illumination light Bb is converted by the phosphor 2, and accordingly, the yellow illumination light Ya has a wide wavelength band including a red band and a green band, which have an energy intensity corresponding to the energy intensity of the blue illumination light Bb. The energy intensity of the blue illumination light Bb may be determined in consideration of conversion efficiency of the phosphor 2 and the intensities of the light irradiated onto the optical modulators of the respective colors.

Figure 4:
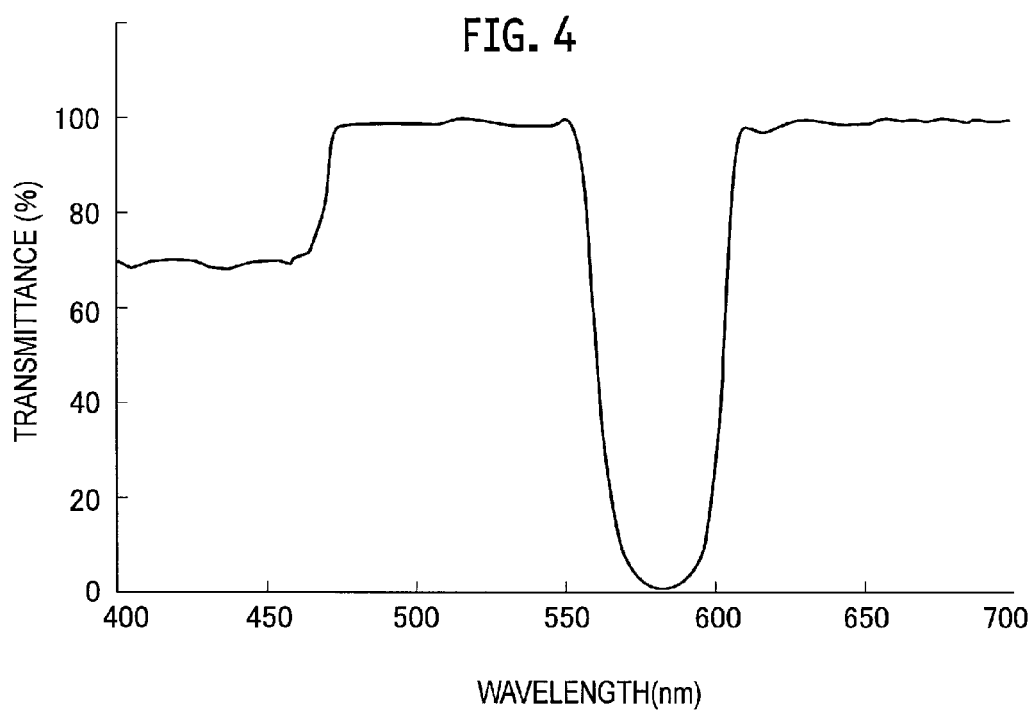
FIG. 4 is a spectral transmittance characteristic chart of a filter of a projection-type image display device according to the first embodiment.

FIG. 4 is a spectral transmittance characteristic chart of the filter 50. The axis of ordinates in FIG. 4 represents the transmittance (%). The axis of abscissas in FIG. 4 represents the wavelength (nm).

The filter 50 reflects approximately 30% of the blue illumination light Bb, and transmits therethrough approximately 70% of the blue illumination light Bb, for example. Moreover, the filter 50 attenuates the component of the second wavelength band between the band of the red illumination light and the band of the green illumination light; that is, a component of a wavelength band of 560 nm to 600 nm, for example. Specifically, the second wavelength band becomes a band wider than the width of the separation boundary of the dichroic mirror 6.

A part of the blue illumination light Bb is reflected as the blue illumination light Bc (the third blue illumination light) by the filter 50, and the blue illumination light Bb other than the reflected blue illumination light Bc transmits through the filter 50, and is emitted as the blue illumination light Bd. The reflected blue illumination light Bc is further reflected by the reflecting mirror 40, and is irradiated onto the phosphor 2 through the collimator lens 23 and the condensing lenses 21 and 22. The phosphor 2 converts energy of the irradiated blue illumination light Bc and generates yellow illumination light Yb (the second yellow illumination light) of a fluorescent band, including the red band and the green band.

Hence, yellow illumination light Yc is irradiated onto the filter 50, which includes: the yellow illumination light Ya generated by the blue illumination light Ba emitted from the light source 1; and the yellow illumination light Yb generated by the blue illumination light Bc that is light returned from the filter 50.

Here, in the design of the projection-type image display device 100, bands, which are desired to be irradiated onto the image display elements of the respective colors, are predetermined as necessary wavelength bands. A component out of the bands desired to be irradiated onto the image display elements of the respective colors becomes an unnecessary component. The second wavelength band of the filter 50 is set as such an unnecessary band as described above, whereby the component unnecessary for the illumination light of the respective colors can be attenuated. For example, the red component that is unnecessary for the green illumination light can be attenuated. In a similar way, the green component that is unnecessary for the red illumination light can be attenuated.

In the first embodiment, at least the second wavelength band becomes a wavelength band, which includes the width of the separation boundary of the dichroic mirror 6, and attenuates the component of the green wavelength band included in the red illumination light, and the component of the red wavelength band included in the green illumination light.

In such a way, the component of the second wavelength band is attenuated by the filter 50, whereby the color purity of each of the red illumination light and the green illumination light can be enhanced, and accordingly, the color gamut can be expanded. Moreover, if the component of the unnecessary wavelength band between the band of the red illumination light and the band of the green illumination light is completely removed, then the color purity of the illumination light of each color can be further enhanced, and accordingly, the color gamut can be further expanded.

Here, the second wavelength band of the filter 50 is adjusted, whereby the wavelength band of the illumination light of each color, which is irradiated onto the image display element of each color, can be adjusted. For example, the short wavelength side of the second wavelength band is set to a shorter wavelength side to thereby change the band of the green illumination light, whereby the wavelength band of the green illumination light can be changed.

Note that the irradiation area of the dichroic mirror 4 may be reduced in order to avoid reduction of the blue illumination light Bc irradiated onto the phosphor 2, the reduction being caused by the fact that the blue illumination light Bc is reflected onto the surface of the dichroic mirror 4b. In this case, the irradiation area is determined in consideration of the balance between the efficiency at which the blue illumination light Ba is irradiated onto the phosphor 2 and the efficiency at which the blue illumination light Bc is irradiated onto the phosphor 2, whereby the conversion efficiency of the yellow illumination light Yc can be enhanced.

Figure 5:
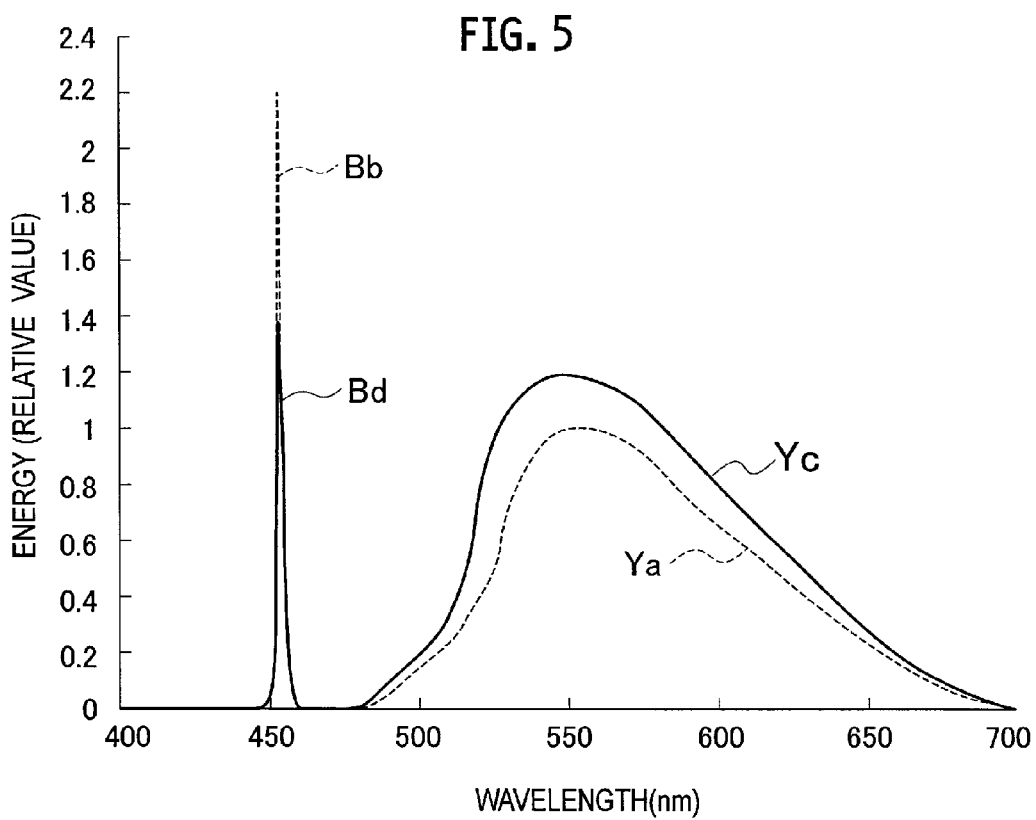
FIG. 5 is a spectral distribution diagram of yellow illumination light and blue illumination light, which are irradiating onto a filter of a projection-type image display device according to the first embodiment.

FIG. 5 is a spectral distribution diagram of the yellow illumination light Yc and the blue illumination light Bd. The axis of ordinates in FIG. 5 represents the energy (the relative value when the peak value of the yellow illumination light Ya is defined as 1). The axis of abscissas in FIG. 5 represents the wavelength (nm). In the color gamut priority mode according to the first embodiment, the peak value of the yellow illumination light Yc is increased from 1 to approximately 1.2, and the peak value of the blue illumination light Bd is reduced from approximately 2.2 to approximately 1.4.

A part of the blue illumination light Bb irradiated onto the filter 50 is reflected as the blue illumination light Bc, and accordingly, the energy of the blue illumination light Bd that is emitted from the filter 50 is smaller than the energy of the blue illumination light Bb (refer to FIG. 3). Meanwhile, the yellow illumination light Yc irradiated onto the filter 50 includes the yellow illumination light Ya and the yellow illumination light Yb, and accordingly, the energy of the yellow illumination light Yc is larger than the energy of the yellow illumination light Ya (refer to FIG. 3). That is, the brightness of the yellow illumination light is increased in comparison with a case where the filter 50 is not inserted. In the yellow illumination light Yc, a component of the unnecessary wavelength band (for example, 560 nm to 600 nm) between the red band and the green band is attenuated by the filter 50. In such a way, from the filter 50, the yellow illumination light Yc is emitted as the yellow illumination light Yd, in which the red illumination light Ra that is a component of the red band, and the green illumination light Ga that is a component of the green band, are subjected to color separation by the filter 50.

Figure 6:
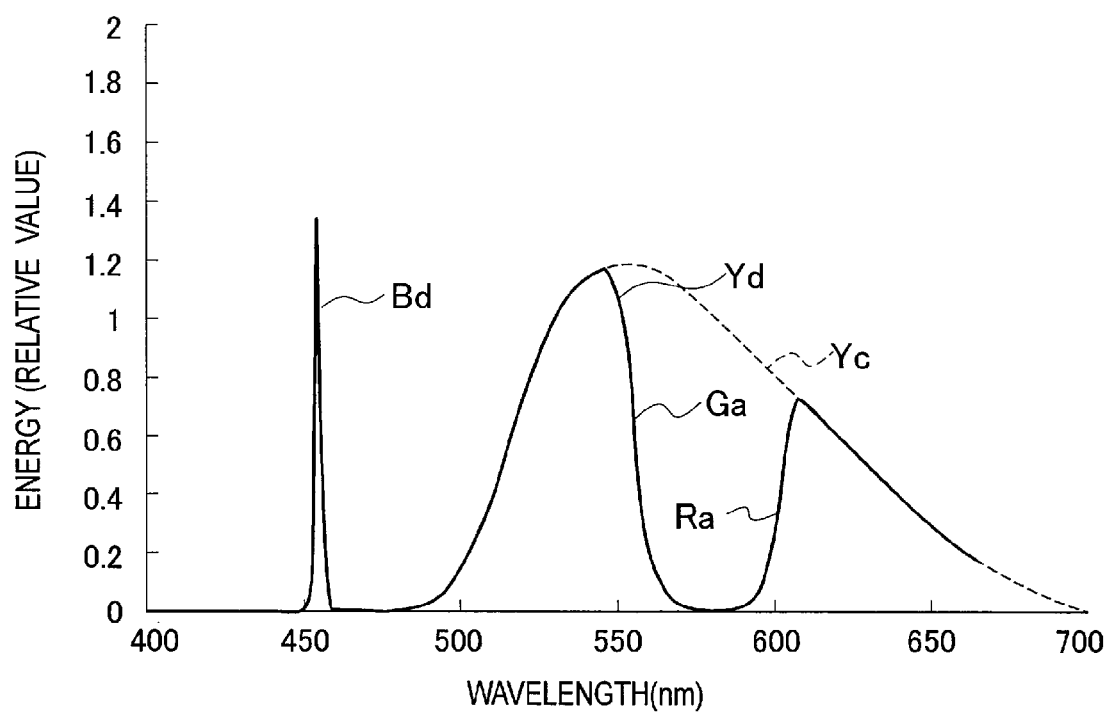
FIG. 6 is a spectral distribution diagram of yellow illumination light and blue illumination light, which is emitted from a filter of a projection-type image display device according to the first embodiment.

FIG. 6 is a spectral distribution diagram of the yellow illumination light Yd and the blue illumination light Bd. The axis of ordinates in FIG. 6 represents energy (relative value). The axis of abscissas in FIG. 6 represents the wavelength (nm). FIG. 6 corresponds to FIG. 5. Note that the broken line in FIG. 6 indicates the yellow illumination light Yc. The yellow illumination light Yd includes the red illumination light Ra that is a component of the red band, and the green illumination light Ga that is a component of the green band.

With regard to the yellow illumination light Yd and the blue illumination light Bd which are emitted from the filter 50, illumination distributions thereof are equalized by the fly-eye lenses 24 and 25. The yellow illumination light Yd and the blue illumination light Bd are aligned to the p-polarization by the PCS 3, and is irradiated onto the cross dichroic mirror 5 through the lens 26.

The yellow illumination light Yd and the blue illumination light Bd are subjected to color separation by the cross dichroic mirror 5. The yellow illumination light Yd is reflected by the reflecting mirror 41, and is irradiated onto the dichroic mirror 6. The red illumination light Ra and the green illumination light Ga, which are included in the yellow illumination light Yd, are subjected to color separation by the dichroic mirror 6.

The red illumination light Ra transmits through the dichroic mirror 6, and is irradiated onto the reflection-type polarization plate 7R through the lens 27. The red illumination light Ra transmits through the reflection-type polarization plate 7R, and is irradiated onto the image display element 10R.

The red illumination light Ra is optically modulated by the image display element 10R, and is emitted as the red image light Rb of the s-polarization. The red image light Rb is reflected by the reflection-type polarization plate 7R, and is irradiated onto the color-combining prism 8.

The green illumination light Ga is reflected by the dichroic mirror 6, and is irradiated onto the reflection-type polarization plate 7G through the lens 28. The green illumination light Ga transmits through the reflection-type polarization plate 7G, and is irradiated onto the image display element 10G.

The green illumination light Ga is optically modulated by the image display element 10G, and is emitted as the green image light Gb of the s-polarization. The green image light Gb is reflected by the reflection-type polarization plate 7G, and is irradiated onto the color-combining prism 8.

The blue illumination light Bd is reflected by the reflecting mirror 42, and is irradiated onto the reflection-type polarization plate 7B through the lens 29. The blue illumination light Bd transmits through the reflection-type polarization plate 7B, and is irradiated onto the image display element 10B.

The blue illumination light Bd is optically modulated by the image display element 10B, and is emitted as the blue image light Be of the s-polarization. The blue image light Be is reflected by the reflection-type polarization plate 7B, and is irradiated onto the color-combining prism 8.

The red image light Rb, the green image light Gb, and the blue image light Be, which are irradiated onto the color-combining prism 8, are combined with one another by the color-combining prism 8, are projected from the projection lens 30 to a screen or the like, and is displayed as a full-color image.

[Brightness Priority Mode]

Figure 7:
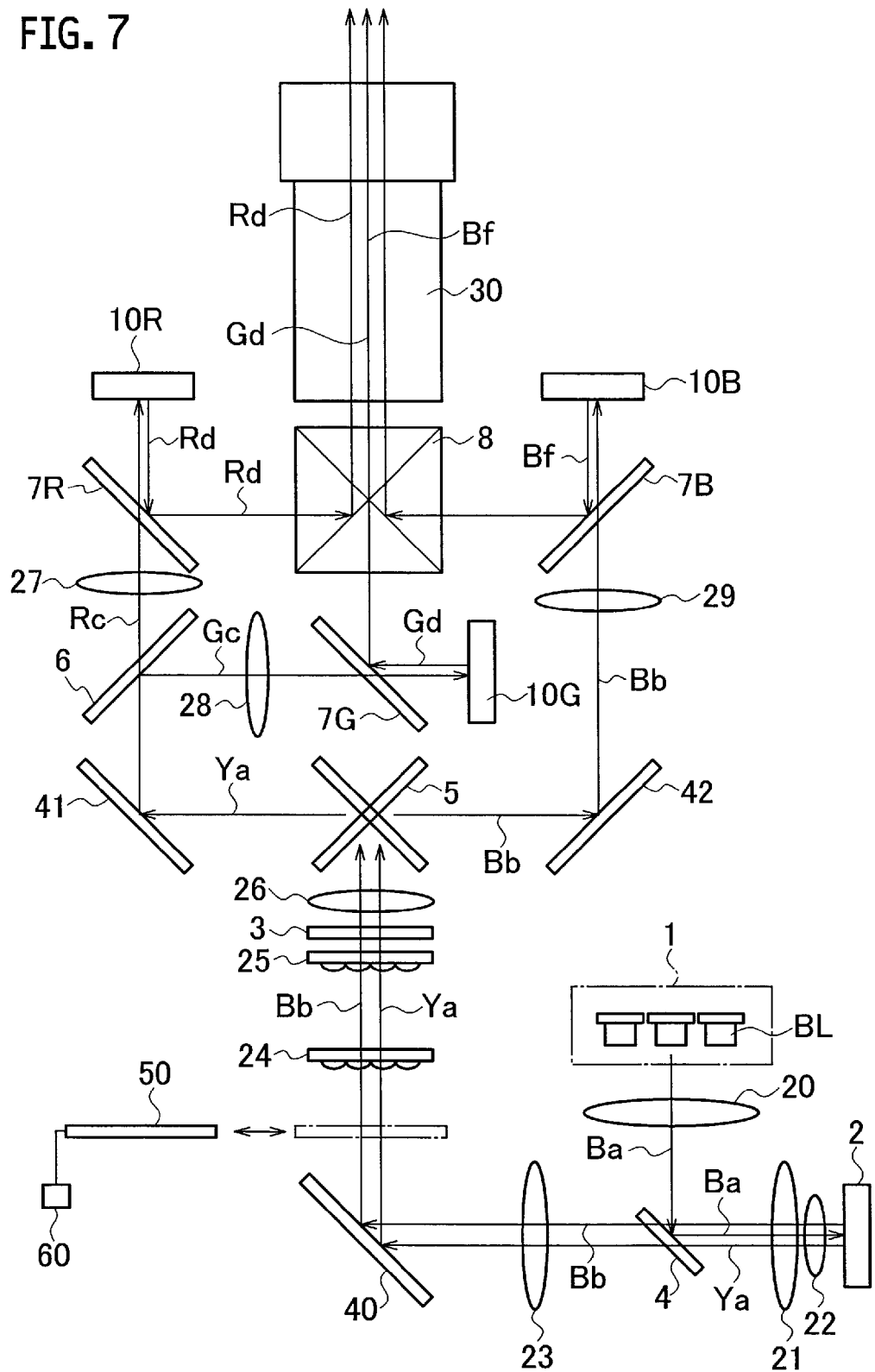
FIG. 7 is a conceptual diagram for explaining a brightness priority mode of a projection-type image display device according to the first embodiment.
Figure 8:
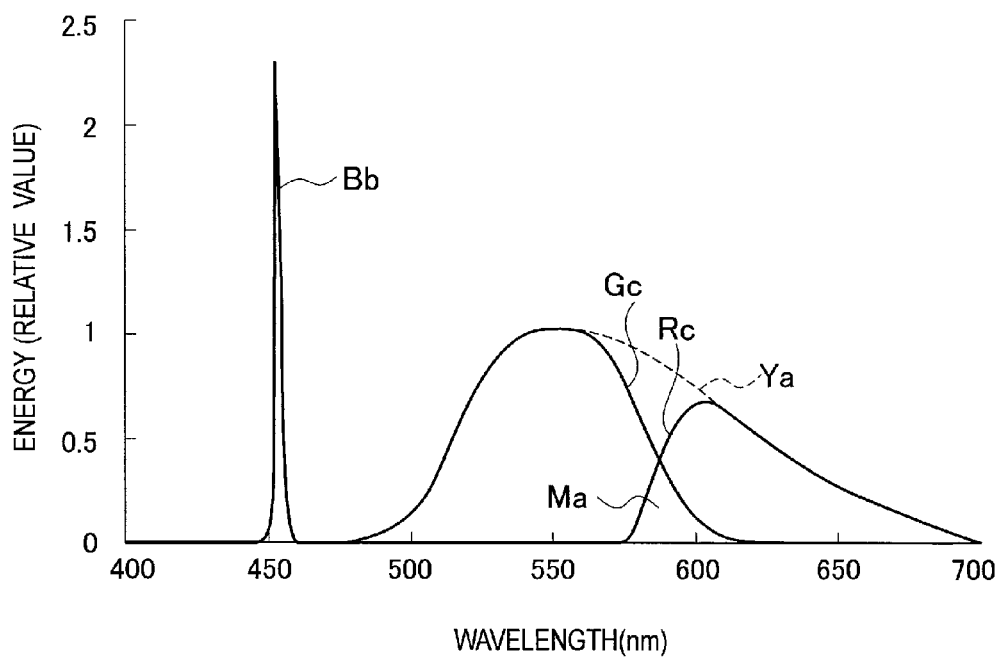
FIG. 8 is a spectral distribution diagram of blue illumination light, red illumination light, and green illumination light, which are subjected to color separation by a dichroic mirror.

By using FIG. 7 and FIG. 8, a description is made of the brightness priority mode. FIG. 7 corresponds to FIG. 1. The brightness priority mode is different from the color gamut priority mode, in that the filter 50 is retracted from the optical path.

As shown in FIG. 7, the blue illumination light Ba emitted from the light source 1 is condensed by the condensing lens 20, and is reflected by the dichroic mirror 4. The blue illumination light Ba is further condensed by the condensing lenses 21 and 22, and is irradiated onto the phosphor 2.

The phosphor 2 converts the energy of the irradiated blue illumination light Ba and generates the yellow illumination light Ya of the wavelength band including the red band the green band.

The yellow illumination light Ya generated by the phosphor 2 transmits through the condensing lenses 22 and 21 and the dichroic mirror 4, and is irradiated onto the collimator lens 23. Note that a part of the blue illumination light Ba that is irradiated onto the phosphor 2 is reflected by the phosphor 2 without being converted into the yellow illumination light Ya, and is irradiated as the blue illumination light Bb onto the collimator lens 23.

The yellow illumination light Ya and the blue illumination light Bb, which are irradiated onto the collimator lens 23, become parallel light, and are reflected toward the fly-eye lens 24 by the reflecting mirror 40. The yellow illumination light Ya and the blue illumination light Bb have spectral distribution characteristics as shown in FIG. 3.

With regard to the yellow illumination light Ya and the blue illumination light Bb, illumination distribution thereof is equalized by the fly-eye lenses 24 and 25. The yellow illumination light Ya and the blue illumination light Bb are aligned to the p-polarization by the PCS 3, and is irradiated onto the cross dichroic mirror 5 through the lens 26.

The yellow illumination light Ya and the blue illumination light Bb are subjected to color separation by the cross dichroic mirror 5. The yellow illumination light Ya is reflected by the reflecting mirror 41, and is irradiated onto the dichroic mirror 6. The red illumination light Rc and the green illumination light Gc, which are included in the yellow illumination light Ya, are subjected to color separation by the dichroic mirror 6.

FIG. 8 is a spectral distribution diagram of the blue illumination light Bb, the red illumination light Rc, and the green illumination light Gc. The axis of ordinates in FIG. 8 represents energy (relative value). The axis of abscissas in FIG. 8 represents a wavelength (nm). FIG. 8 corresponds to FIG. 3. Note that the broken line in FIG. 8 indicates the yellow illumination light Ya.

The red illumination light Rc transmits through the dichroic mirror 6, and is irradiated onto the reflection-type polarization plate 7R through the lens 27. The red illumination light Rc transmits through the reflection-type polarization plate 7R, and is irradiated onto the image display element 10R.

The red illumination light Rc is optically modulated by the image display element 10R, and is emitted as the red image light Rd of the s-polarization. The red image light Rd is reflected by the reflection-type polarization plate 7R, and is irradiated onto the color-combining prism 8.

The green illumination light Gc is reflected by the dichroic mirror 6, and is irradiated onto the reflection-type polarization plate 7G through the lens 28. The green illumination light Gc transmits through the reflection-type polarization plate 7G, and is irradiated onto the image display element 10G.

The green illumination light Gc is optically modulated by the image display element 10G, and is emitted as the green image light Gd of the s-polarization. The green image light Gd is reflected by the reflection-type polarization plate 7G, and is irradiated onto the color-combining prism 8.

The blue illumination light Bb is reflected by the reflecting mirror 42, and is irradiated onto the reflection-type polarization plate 7B through the lens 29. The blue illumination light Bb transmits through the reflection-type polarization plate 7B, and is irradiated onto the image display element 10B.

The blue illumination light Bb is optically modulated by the image display element 10B, and is emitted as the blue image light Bf of the s-polarization. The blue image light Bf is reflected by the reflection-type polarization plate 7B, and is irradiated onto the color-combining prism 8.

The red image light Rd, the green image light Gd, and the blue image light Bf are combined with one another by the color-combining prism 8, are projected from the projection lens 30 to the screen or the like, and is displayed as a full-color image.

COMPARATIVE EXAMPLE

Figure 9:
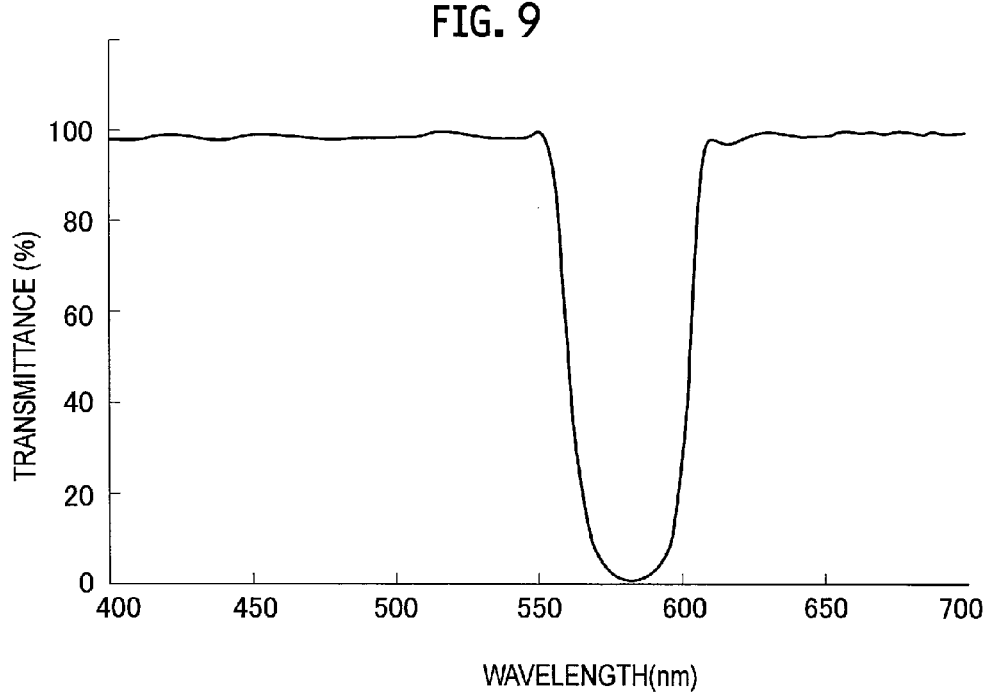
FIG. 9 is a spectral transmittance characteristic chart of a filter of a comparative example.
Figure 10:
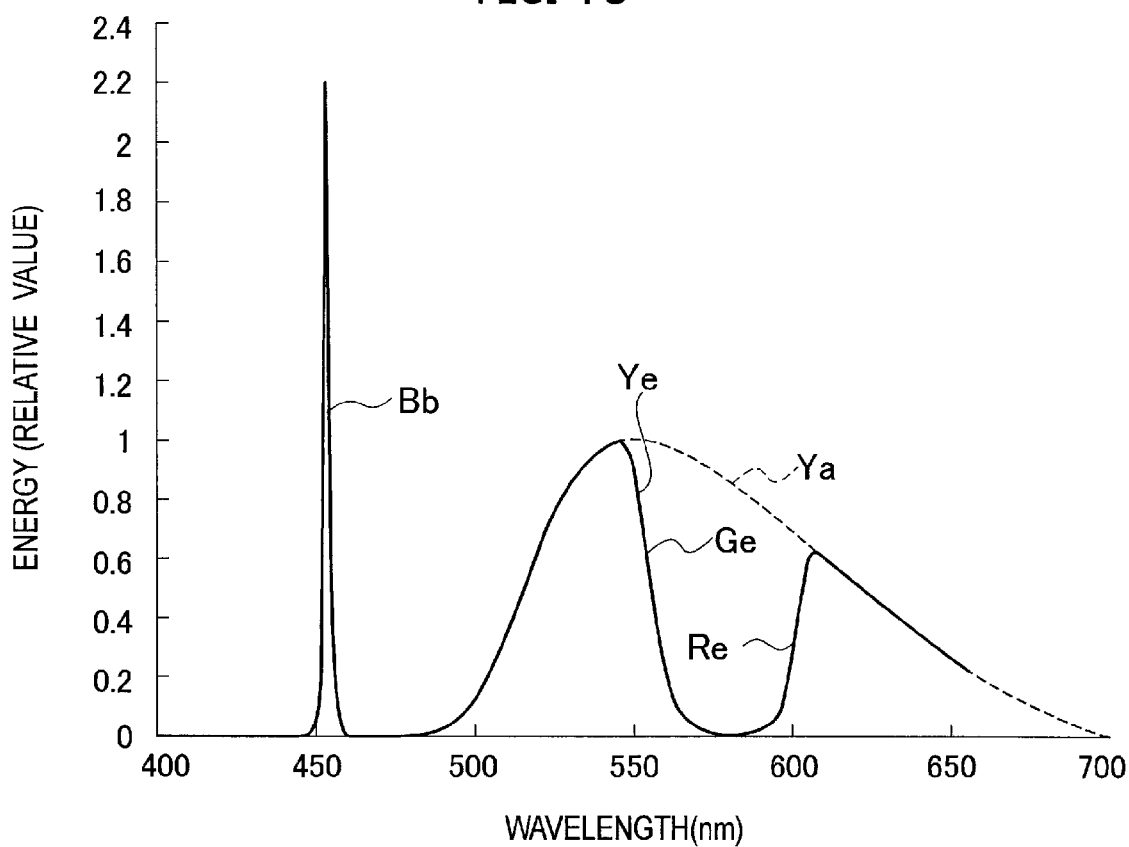
FIG. 10 is a spectral distribution diagram of yellow illumination light and blue illumination light, which is emitted from a filter of a comparative example.

By using FIG. 9 and FIG. 10, a description is made of a comparative example with the projection-type image display device 100 according to the first embodiment.

A different point of a projection-type image display device in a comparative example from the projection-type image display device 100 according to the first embodiment is that a filter in the comparative example has only the function as a notch filter, and has different spectral transmittance characteristics. Configurations other than the filter in the comparative example are the same as those of the projection-type image display device 100 (refer to FIG. 1) according to the first embodiment. For the purpose of facilitating the understanding of the explanation, the same reference numerals are assigned to the same constituents as those of the projection-type image display device 100 according to the first embodiment.

FIG. 9 is a wavelength transmittance characteristic chart of the filter of the comparative example. The axis of ordinates in FIG. 9 represents the transmittance (%). The axis of abscissas in FIG. 9 represents the wavelength (nm). FIG. 9 corresponds to FIG. 4. For example, the filter of the comparative example attenuates the component of the unnecessary wavelength band of 560 to 600 nm.

In the yellow illumination light Ya irradiated onto the filter of the comparative example, the component of the unnecessary wavelength band (for example, 560 nm to 600 nm) between the red band and the green band is attenuated. The yellow illumination light Ya is emitted as the yellow illumination light Ye, in which the red illumination light Re that is a component of the red band, and the green illumination light Ge that is a component of the green band, are subjected to color separation by the filter of the comparative example.

FIG. 10 is a spectral distribution diagram of the yellow illumination light Ye and the blue illumination light Bb, which are emitted from the filter of the comparative example. The axis of ordinates in FIG. 10 represents energy (the relative value when the peak value of the yellow illumination light Ya is defined as 1). The axis of abscissas in FIG. 10 represents the wavelength (nm). In this comparative example, the peak value of the yellow illumination light Ya is 1, and the peak value of the blue illumination light Bd is approximately 2.2. FIG. 10 corresponds to FIG. 6. Note that the broken line in FIG. 10 indicates the yellow illumination light Ya. The yellow illumination light Ye includes the red illumination light Re that is a component of the red band, and the green illumination light Ge that is a component of the green band.

The yellow illumination light Ye and the blue illumination light Bb, which are emitted from the filter of the comparative example, are projected onto the projection lens 30 through the same optical path as that for the yellow illumination light Yd and the blue illumination light Bd, which are emitted from the filter 50 of the projection-type image display device 100 according to the first embodiment.

[White Balance]

By using FIG. 5, FIG. 6, FIG. 8, and FIG. 10 to FIG. 14, a description is made of the white balance of images displayed in a state where the filter 50 of the projection-type image display device 100 according to the first embodiment is disposed on the optical path (hereinafter, this state is referred to as the color gamut priority mode of the first embodiment), and in a state where the filters 50 of the first embodiment and the comparative example are retracted from the optical path (hereinafter, this state is referred to as the brightness priority mode) in order of the brightness priority mode, the color gamut priority mode of the comparative example, and the color gamut priority mode according to the first embodiment.

Figure 11:
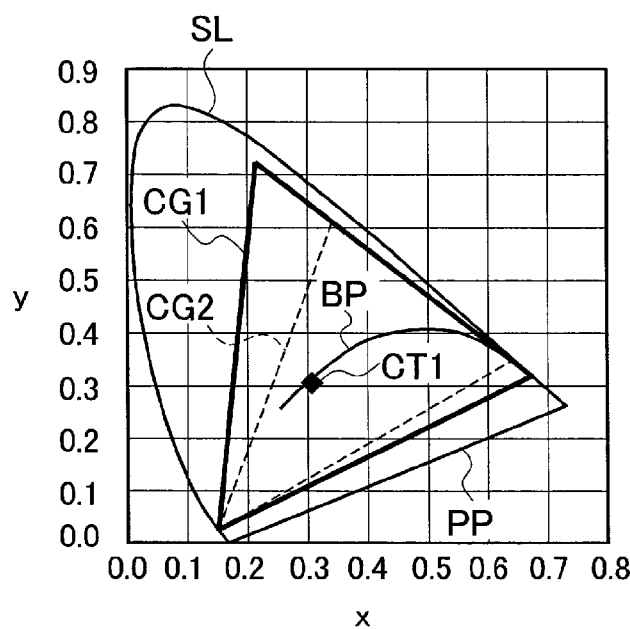
FIG. 11 is a chromaticity diagram in a state where a filter of a projection-type image display device according to the first embodiment is disposed in the optical path.
Figure 12:
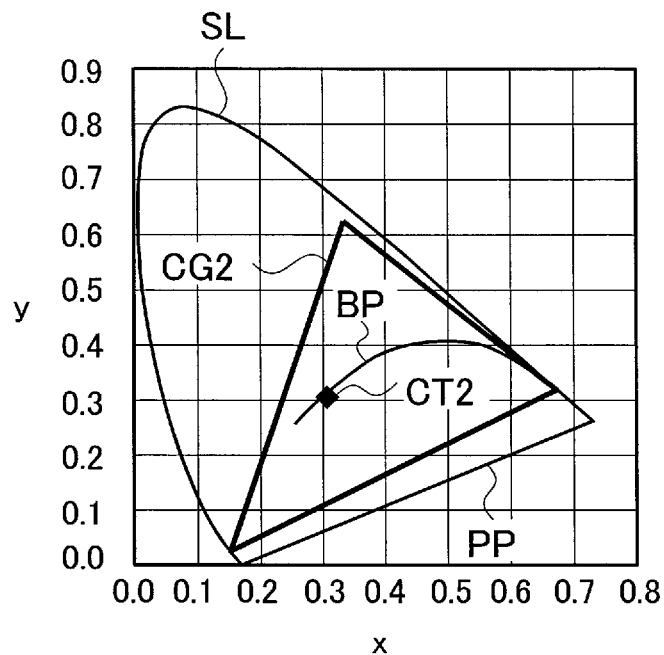
FIG. 12 is a chromaticity diagram in a state where a filter of a projection-type image display device according to the first embodiment is retracted from the optical path.
Figure 13:
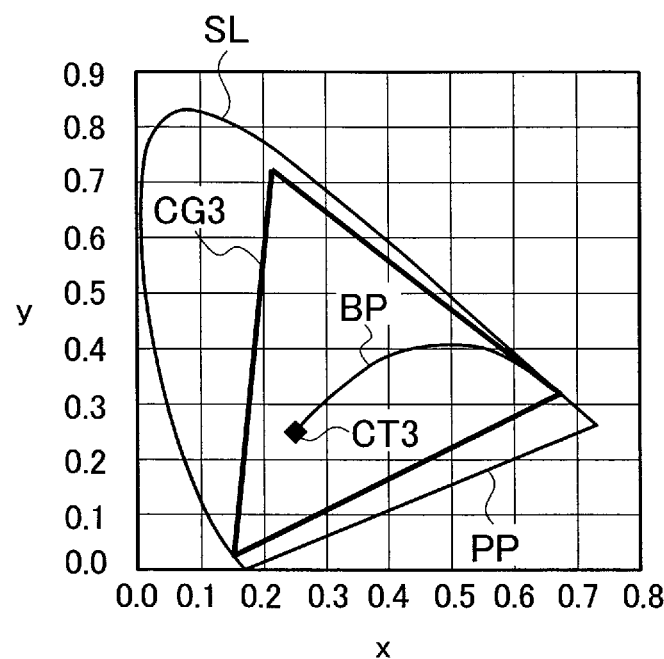
FIG. 13 is a chromaticity diagram of a comparative example.

FIG. 11 shows an xy chromaticity diagram of a display image in the color gamut priority mode according to the first embodiment. FIG. 12 shows an xy chromaticity diagram of a display image in the brightness priority mode according to the first embodiment. FIG. 13 shows an xy chromaticity diagram of a display image in the color gamut priority mode of the comparative example. Reference line SL in FIG. 11 to FIG. 13 each denotes a spectrum locus. Reference line PP denotes a pure boundary. Reference line BP denotes a blackbody locus. Note that the broken line in FIG. 11 indicates the color gamut CG2 in FIG. 12. FIG. 14 shows comparison results of color temperatures, brightness, and color gamuts of the respective display images.

In the brightness priority mode, as shown in FIG. 8, the red illumination light Rc and the green illumination light Gc have a mixed color area Ma that is a component of the unnecessary wavelength band. From this, the red illumination light Rc and the green illumination light Gc are not sufficiently subjected to the color separation. Therefore, as shown in FIG. 12, the color gamut CG2 is biased to the yellow side, and is narrow. The color temperature CT2 is 6500K (refer to FIG. 14) that is the target setting value.

In the color gamut priority mode of the comparative example, the filter of the comparative example has only a function as a notch filter, and accordingly, as shown in FIG. 10, the red illumination light Re and the green illumination light Ge can be subjected to color separation. The peak intensity of the yellow illumination light Ye is the relative value of 1 in a similar way to the yellow illumination light Ya. Therefore, the color gamut CG3 can be expanded as shown in FIG. 13. The color gamut CG3 is changed in response to an attenuation of a component in the mixed color area of the red illumination light Re and the green illumination light Ge by the filter of the comparative example. For example, if the attenuation of the component in the mixed color area is large, then the color gamut CG3 is expanded more.

However, in the color gamut priority mode of the comparative example, the component in the mixed color area of the red illumination light Re and the green illumination light Ge is attenuated, whereby the brightness of the display image decreases, and the white balance thereof is changed. For example, the color temperature CT3 is changed to 7500 K (refer to FIG. 14) that is the blue side. Therefore, it is necessary to perform an electric adjustment (for example, an adjustment to decrease the gain by an optical modulation gain adjustment by the image display element 10B) for the white balance, while taking the peak value 1 of the yellow illumination light Ye as a reference.

For these, in the color gamut priority mode according to the first embodiment, the red illumination light Ra and the green illumination light Ga can be subjected to color separation by the filter 50 as shown in FIG. 6. Therefore, as shown in FIG. 11, the color gamut CG1 can be expanded more than in a state where the filter 50 is retracted from the optical path. The color gamut CG1 is changed in response to an attenuation of the component in the mixed color area of the red illumination light Re and the green illumination light Ge by the filter 50. For example, if the attenuation of the component in the mixed color area is large, then the color gamut CG1 is expanded more.

Moreover, in a state where the filter 50 is disposed on the optical path, a part of the blue illumination light Bb is reflected as the blue illumination light Bc by the filter 50, and the other thereof is emitted as the blue illumination light Bd from the filter 50. The reflected blue illumination light Bc is irradiated onto the phosphor 2, whereby the yellow illumination light Yb is generated. Hence, as shown in FIG. 5, the yellow illumination light Yc is irradiated onto the filter 50, which includes: the yellow illumination light Ya generated by the blue illumination light Ba emitted from the light source 1; and the yellow illumination light Yb generated by the blue illumination light Bc that is the light returned from the filter 50.

As shown in FIG. 6, with regard to the yellow illumination light Yc, the component of the unnecessary wavelength band between the red band and the green band is attenuated by the filter 50, whereby the red illumination light Ra and the green illumination light Ga are subjected to color separation and are emitted from the filter 50.

That is, a part of the blue illumination light Bb is reflected by the filter 50, whereby the amount of the blue illumination light Bd emitted from the filter 50 is reduced from approximately 2.2 to approximately 1.4, and further, the blue illumination light Bc reflected by the filter 50 is converted into the yellow illumination light Yb, and the amount of the yellow illumination light Yc is increased from 1 to approximately 1.2. In such a way, the change of the color temperature which is caused by the attenuation of a component of the mixed color area of the red illumination light Ra and the green illumination light Ga can be reduced by reflecting a part of the blue illumination light Bb by the filter 50, and increasing the ratio of the yellow illumination light Yc to the blue illumination light Bd.

Hence, in the first embodiment, the filter 50 reflects a part of the blue illumination light Bb to the phosphor 2 side at an appropriate reflectance, whereby a change in the white balance becomes minimal even when the color gamut is expanded, and accordingly, the electric adjustment does not have to be performed. Hence, the utilization efficiency of the light is enhanced, and a decrease in the brightness of the display image can be reduced. In other words, while the peak value of the yellow illumination light Ye is 1 in the color gamut priority mode of the comparative example, the peak value of the yellow illumination light Yc is approximately 1.2 in the color gamut priority mode according to the first embodiment, and accordingly, the color gamut priority mode according to the first embodiment can brighten the display image more in comparison with the color gamut priority mode of the comparative example.

In a state where the filter 50 is disposed on the optical path, a brighter image than in the comparative example can be displayed though the brightness of the image is reduced more than in a state where the filter 50 is retracted from the optical path.

Second Embodiment

By using FIG. 15 to FIG. 18, a description is made of a projection-type image display device according to the second embodiment.

Figure 15:
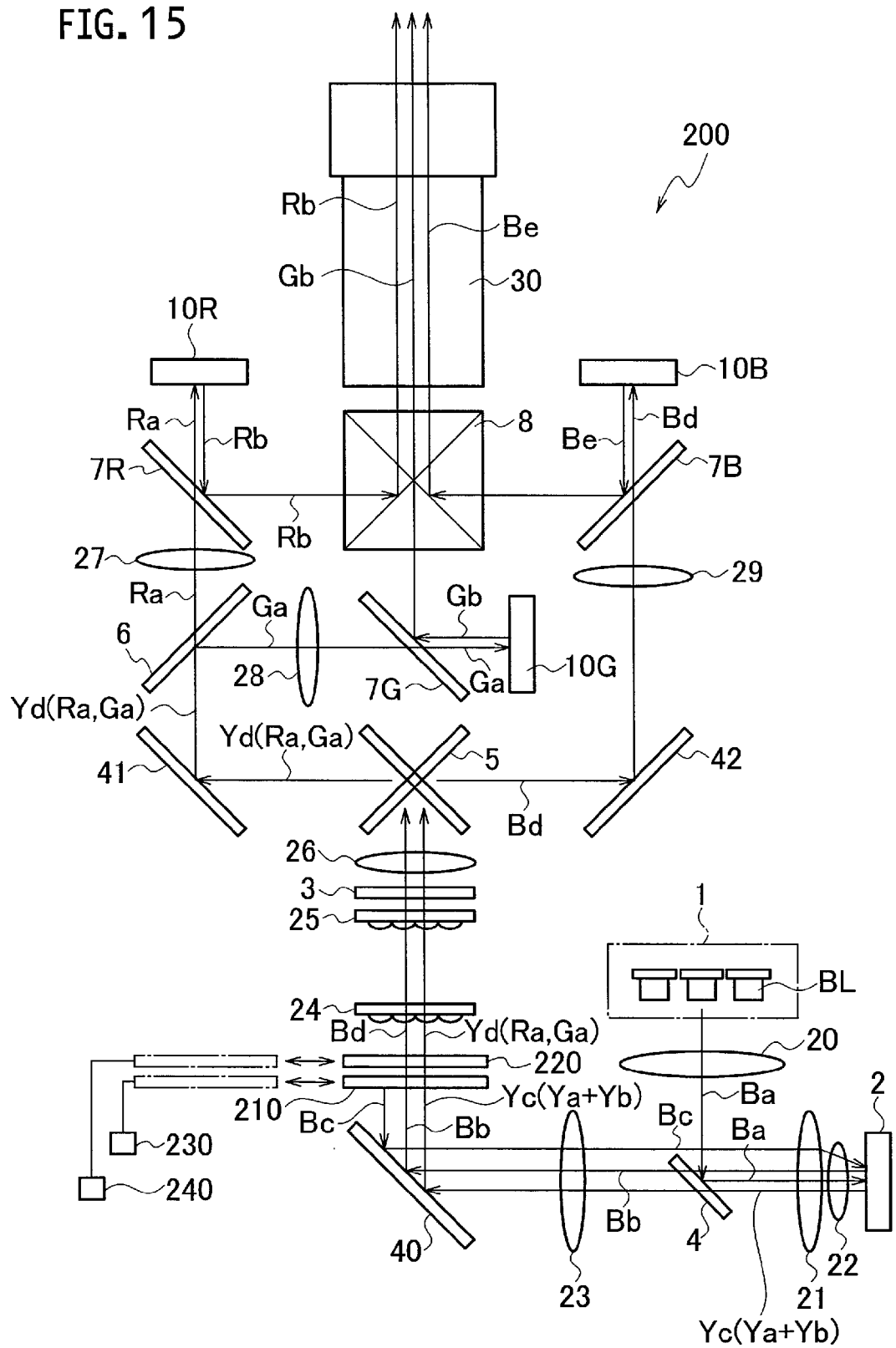
FIG. 15 is a configuration diagram showing a projection-type image display device according to the second embodiment.

FIG. 15 shows the entire configuration of the projection-type image display device according to the second embodiment. The projection-type image display device according to the second embodiment is different from the projection-type image display device according to the first embodiment in the configuration of the filter, and is the same as the others. Therefore, the filter is described for the most part. Note that, for the purpose of facilitating an understanding of the explanation, the same reference numerals are assigned to the same constituents as those of the projection-type image display device according to the first embodiment.

The projection-type image display device 200 includes: a light source 1; a phosphor 2; a PCS 3; dichroic mirrors 4 to 6; reflection-type polarization plates 7R, 7G, and 7B; a color-combining prism 8; image display elements 10R, 10G, and 10B; lenses 20 to 30; reflecting mirrors 40 to 42; filters 210 and 220; and motors 230 and 240.

The filter 210 (the first filter) has a function as a predetermined wavelength band reflection filter that reflects a part of the blue illumination light and transmits the others therethrough.

Figure 16:
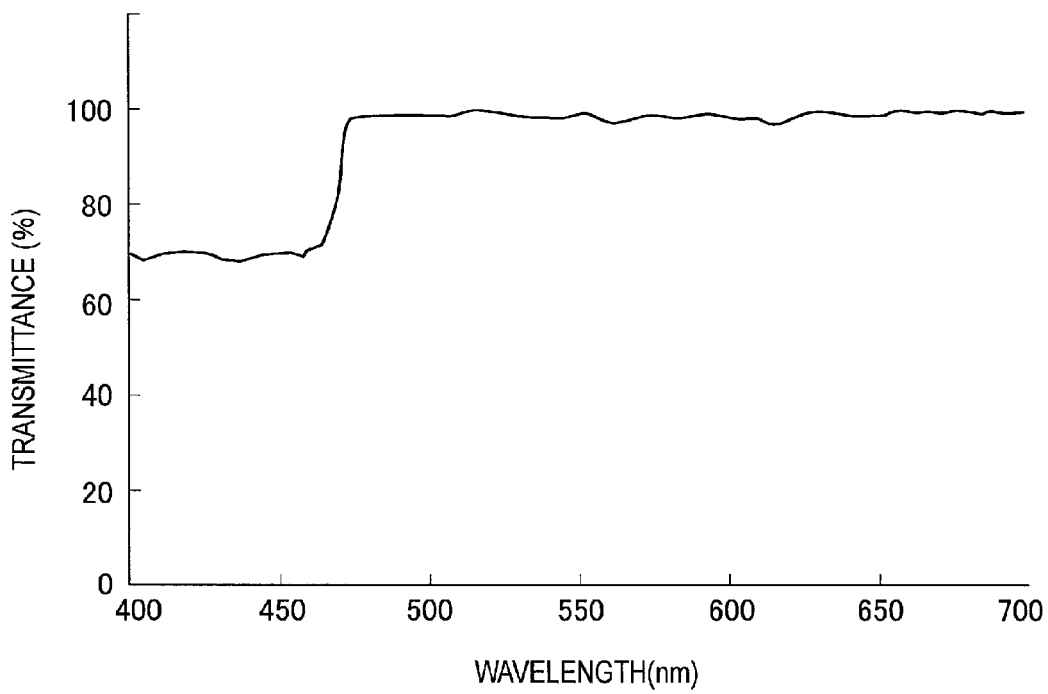
FIG. 16 is a spectral transmittance characteristic chart of a first filter of a projection-type image display device according to the second embodiment.

FIG. 16 is a spectral transmittance characteristic chart of the filter 210. The axis of ordinates in FIG. 16 represents a transmittance (%). The axis of abscissas in FIG. 16 represents a wavelength (nm). For example, the filter 210 reflects approximately 30% of the blue illumination light Bb, and transmits therethrough approximately 70% of the blue illumination light Bb. Moreover, the filter 220 transmits therethrough components of wavelength bands, which are different than the component of the blue wavelength band.

The filter 220 (the second filter) has a function as a notch filter, which attenuates a component of an unnecessary wavelength band between the red band and the green band, and transmits components of other wavelength bands therethrough.

Figure 17:
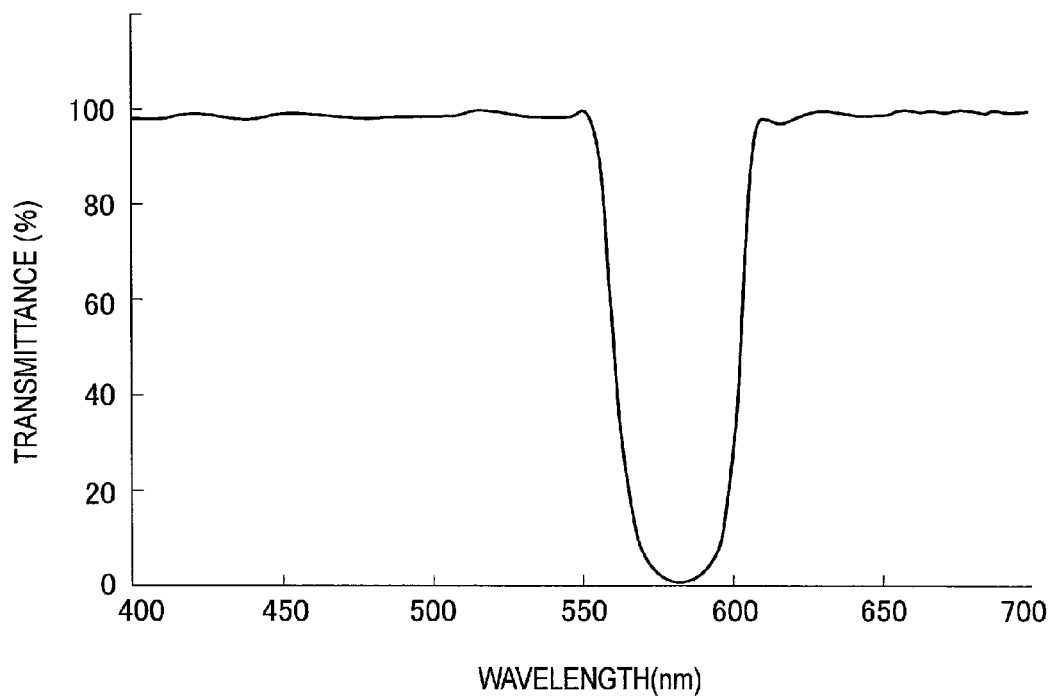
FIG. 17 is a spectral transmittance characteristic chart of a second filter of a projection-type image display device according to the second embodiment.

FIG. 17 is a spectral transmittance characteristic chart of the filter 220. The axis of ordinates in FIG. 17 represents a transmittance (%). The axis of abscissas in FIG. 17 represents a wavelength (nm). For example, the filter 220 attenuates the component of an unnecessary wavelength band of 560 nm to 600 nm, and transmits components of other wavelength bands.

Figure 18:
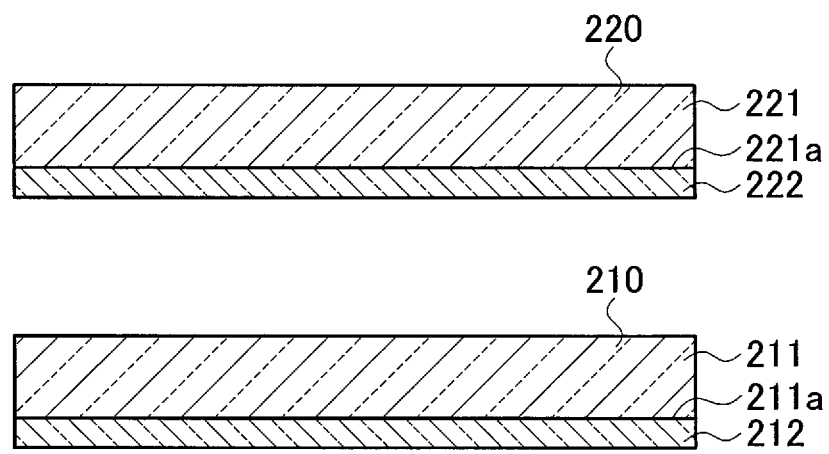
FIG. 18 is a cross-sectional view schematically showing the filters of a projection-type image display device according to the second embodiment.

FIG. 18 is a cross-sectional view schematically showing the filters 210 and 220. The filter 210 includes: a transparent substrate 211 such as a glass substrate; and a dielectric multilayered film 212 formed on the first surface 211a side of the transparent substrate 211. The dielectric multilayered film 212 reflects a part of the blue illumination light, and transmits the others therethrough. That is, the filter 210 has a function as the predetermined wavelength band reflection filter. The dielectric multilayered film 212 is a multilayered film in which high-refractive-index dielectric films and low-refractive-index dielectric films are laminated alternately with each other. By materials of the dielectric films, the thickness of each of the films, the number of layers and the like in the dielectric multilayered film 212, it is possible to set the reflectance of the blue illumination light to a desired value.

The filter 220 includes: a transparent substrate 221 such as a glass substrate; and a dielectric multilayered film 222 formed on the first surface 221a side of the transparent substrate 221. The dielectric multilayered film 222 attenuates a component of the second wavelength band of the yellow illumination light which is narrower than the first wavelength band. That is, the filter 220 has a function as a notch filter, which attenuates a component of the unnecessary wavelength band between the red band and the green band and transmits components of other wavelength bands therethrough. The dielectric multilayered film 222 is a multilayered film in which the high-refractive-index dielectric films and the low-refractive-index dielectric films are laminated alternately with each other. By materials of the dielectric films, the thickness of each of the films, the number of layers and the like in the dielectric multilayered film 222, it is possible to set the wavelength band for attenuating the unnecessary components to a desired range.

The filter 210 may be disposed on the irradiated side on the optical path, and the filter 220 may be disposed on the emitting side thereon, or alternatively, the filter 210 may be disposed on the emitting side, and the filter 220 may be disposed on the irradiated side. The dielectric multilayered film 212 may be formed on the irradiated surface side of the transparent substrate 211, or may be formed on the emitting surface side thereof. The dielectric multilayered film 222 may be formed on the irradiated surface side of the transparent substrate 221, or may be formed on the emitting surface side thereof.

The motor 230 has a function as a driver (a first driver) that inserts the filter 210 onto the optical path and retracts the filter 210 from the optical path. The motor 230 is an example of a driver.

The motor 240 has a function as a driver (a second driver) that inserts the filter 220 onto the optical path and retracts the filter 220 from the optical path. The motor 240 is an example of a driver.

Hence, while the projection-type image display device 100 according to the first embodiment includes the filter 50 that has two functions of the notch filter and the predetermined wavelength band reflection filter, the projection-type image display device 200 according to the second embodiment includes two filters classified in terms of function, which are: the filter 210 that has the function of the predetermined wavelength band reflection filter; and the filter 220 that has the function of the notch filter.

Such a state where the filter 210 and the filter 220 are disposed on the optical path exerts the same functions and effects as those in a state where the filter 50 is disposed onto the optical path in the projection-type image display device 100 exert the first embodiment.

A part of the blue illumination light Bb irradiated onto the filter 210 is reflected as blue illumination light Bc by the filter 210, and the blue illumination light Bb that is other than the reflected blue illumination light Bc transmits through the filter 210, and is emitted as blue illumination light Bd. The blue illumination light Bd transmits through the filter 220.

Meanwhile, the reflected blue illumination light Bc reflected by the filter 210 is further reflected by the reflecting mirror 40, and is irradiated onto the phosphor 2 through the collimator lens 23 and the condensing lenses 21 and 22. The phosphor 2 generates yellow illumination light Yb of a wavelength band which includes the red band and the green band by energy of the irradiated blue illumination light Bc.

Hence, yellow illumination light Yc is irradiated onto the filter 210, which includes: the yellow illumination light Ya generated by the blue illumination light Ba emitted from the light source 1; and the yellow illumination light Yb generated by the blue illumination light Bc that is light returned from the filter 220.

The yellow illumination light Yc transmits through the filter 210, and is irradiated onto the filter 220. In the yellow illumination light Yc, a component of the unnecessary wavelength band (for example, 560 nm to 600 nm) between the red band and the green band, is attenuated by the filter 220. In such a way, the yellow illumination light Yc is emitted as yellow illumination light Yd, in which red illumination light Ra, that is a component of the red band and green illumination light Ga that is a component of the green band, are subjected to color separation by the filter 220.

With regard to the yellow illumination light Yd and the blue illumination light Bd, which are emitted from the filter 220, illumination distributions thereof are equalized by the fly-eye lenses 24 and 25. The yellow illumination light Yd and the blue illumination light Bd are aligned to the p-polarization by the PCS 3, and is irradiated onto the cross dichroic mirror 5 through the lens 26. The steps from 5 and after the above are similar to those of the projection-type image display device 100 according to the first embodiment.

In the projection-type image display device 200, it is possible to insert the filter 210 and the filter 220 onto the optical path at the same time, or it is also possible to insert only one of either the filter 210 or the filter 220 thereonto.

For example, in a state where only the filter 220 is disposed onto the optical path, the color temperature becomes higher than the target setting value. There is a case where a high color temperature is preferable, depending on the operating environment or the preference of the user. In such a case, only the filter 220 may be disposed onto the optical path.

[Reflectance of Filter]

In the projection-type image display device 100 according to the first embodiment and the projection-type image display device 200 according to the second embodiment, the reflectance of each of the filters 50 and the filter 210, with respect to the blue illumination light Bb, is set to approximately 30%; however, the present disclosure is not limited to this. In order to achieve the desired white balance (color temperature), preferably, the reflectance of each of the filter 50 and the filter 210 is set to an appropriate value in response to the conversion efficiency of the phosphor 2, or the notch filter characteristics of the filter 50 and the filter 220, or the like. For example, the conversion efficiency of the phosphor is changed depending on the type of the phosphor, the temperature of the phosphor, and the wavelength, power, spot diameter or the like of the blue illumination light irradiated onto the phosphor.

A description is made of an example of a setting method of the reflectance of the filter 50 in the projection-type image display device 100 according to the first embodiment, with respect to the blue illumination light (Bb). Note that a similar setting method can also be used for the filter 210 in the projection-type image display device 200 according to the second embodiment.

In an optical system in the state where the filter 50 is retracted from the optical path or in a state corresponding to this state, there are measured: the power of the blue illumination light Ba emitted from the light source 1; the power of each of the blue illumination light Bb and the yellow illumination light Ya at a position where the filter 50 is disposed; and spectral distributions thereof, whereby the conversion efficiency of the phosphor 2 is calculated.

The power of the yellow illumination light Ya is measured, which is generated by the phosphor 2 in such a manner that the blue illumination light Ba is irradiated onto the phosphor 2 while changing the power thereof, and a correlation is calculated of the yellow illumination light Ya with the power of the blue illumination light Ba.

In an optical system in a state where the filter 50 is disposed on the optical path or in a state corresponding to this state, the powers and the spectral distributions are measured.

The color temperature is calculated from the measurement results of the spectral distributions, and the reflectance with respect to the blue illumination light which serves for achieving the target color temperature based on the calculation result, is calculated.

Note that the power of the yellow illumination light Yb, which is generated in such a manner that the blue illumination light Bc that is the light returned from the filter 50 is irradiated onto the phosphor 2, differs depending on the optical systems. Hence, in order to enhance setting accuracy for the reflectance, desirably, the measurement is performed in a state as similar as possible to the actual optical system.

The conversion efficiency of the phosphor 2 is also changed by the power of the blue illumination light Ba emitted from the light source 1. Therefore, when the reflectance is set at the maximum power, then at the minimum power, the reflectance deviates from the target value thereof. Accordingly, the reflectance is set at an intermediate power in a settable range, whereby such a deviation of the reflectance from the target value can be suppressed to a minimum over the whole of the settable range.

Note that in the case where recommended power is already determined, the reflectance may be set in accordance with the recommended power.

Note that the present invention is not limited to the configurations of the first and second embodiments mentioned above, and is changeable in various ways within the scope without departing from the scope of the present invention.

What is claimed is:

1. A projection-type image display device comprising:
   a light source configured to emit a first blue illumination light;
   a phosphor configured to generate a first yellow illumination light of a first wavelength band from a part of the first blue illumination light, the first yellow illumination light including a component of a red band and a component of a green band, and configured to reflect a second blue illumination light and the first yellow illumination light; and
   a filter configured to reflect, to the phosphor side, a third blue illumination light that is a part of the second blue illumination light reflected by the phosphor, and configured to attenuate a component of a second wavelength band of the first yellow illumination light, the second wavelength band being narrower than the first wavelength band,
   wherein the phosphor also generates a second yellow illumination light from the third blue illumination light reflected by the filter.

2. The projection-type image display device according to claim 1, wherein the filter is disposed on an optical path of parallel light which are the second blue illumination light, and the first and second yellow illumination light.

3. The projection-type image display device according to claim 1, wherein
   the filter comprises:
   a transparent substrate;
   a first dielectric multilayered film that is formed on a first surface side of the transparent substrate, and configured to reflect, to the phosphor, the third blue illumination light; and
   a second dielectric multilayered film that is formed on a second surface side of the transparent substrate, and configured to attenuate the component of the second wavelength band of the first and second yellow illumination light.

4. The projection-type image display device according to claim 1, wherein
   the filter comprises:
   a first filter configured to reflect, to the phosphor side, the third blue illumination light; and
   a second filter configured to attenuate the component of the second wavelength band of the first and second yellow illumination light.

* * * * *